May 13, 1941.  C. MACMILLAN  2,242,010
DYNAMOELECTRIC MACHINE
Filed Oct. 25, 1939
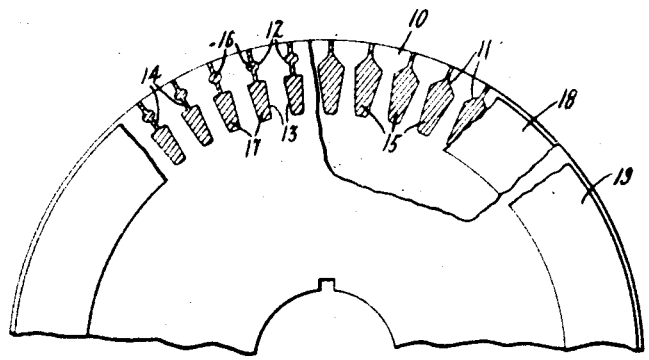
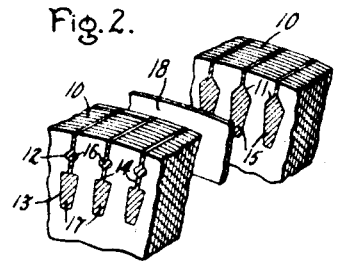
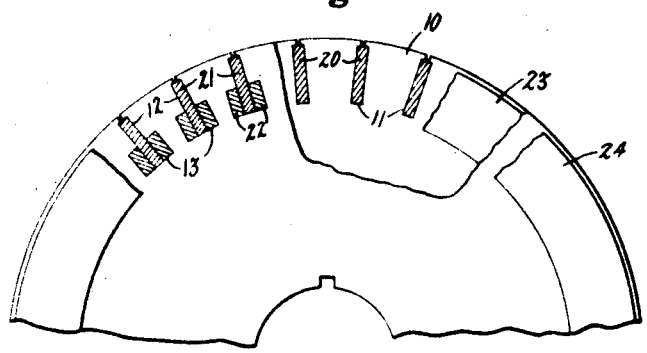
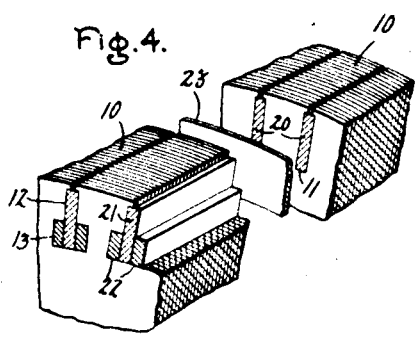
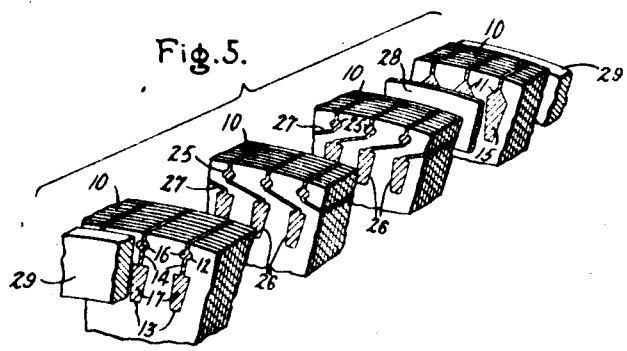
Inventor:
Campbell Macmillan,
by Harry E. Dunham
His Attorney.

Patented May 13, 1941

2,242,010

UNITED STATES PATENT OFFICE 2,242,010

DYNAMOELECTRIC MACHINE

Campbell Macmillan, Scotia, N. Y., assignor to General Electric Company, a corporation of New York Application October 25, 1939, Serial No. 301,207

2 Claims. (Cl. 172—120)

My invention relates to improvements in dynamoelectric machines, and particularly to the type of machine utilizing a multiple section winding in a portion of one of the elements thereof.

An object of my invention is to provide a dynamoelectric machine wherein one element thereof is provided with a multiple section winding in a portion thereof.

Another object of my invention is to provide an improved dynamoelectric machine winding wherein a part of one of the windings is a multiple section winding and another part of the winding is a single section winding with short-circuiting rings electrically connecting together the ends of the conductors in different sections of the winding.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is an end view of a part of a dynamoelectric machine rotatable member embodying my invention partly broken away to illustrate the relative arrangement of the different parts of the winding; Fig. 2 is an exploded perspective view of a part of the machine element shown in Fig. 1; Fig. 3 is an end view of a part of a dynamoelectric machine member partly broken away to show a modification of the arrangement illustrated in Figs. 1 and 2; Fig. 4 is an exploded perspective view of a part of the machine element shown in Fig. 3; and Fig. 5 is an exploded perspective view of a part of the rotatable member of a dynamoelectric machine illustrating a further modification of my invention.

Referring to the drawing, I have shown in Fig. 1 a dynamoelectric machine rotatable member provided with a core formed of a plurality of laminations 10 of magnetic material having a plurality of winding slots arranged about the outer periphery thereof. Two types of winding slots are used in the laminations forming this core, both of which have been used in conventional squirrel cage induction motor rotors in the past. The improvement in the present construction is obtained by a combination of these somewhat conventional winding slots to provide improved operating characteristics which are not obtainable by the use of either of the conventional types of slots alone. In squirrel cage induction motor rotors, the windings generally have been provided with either single section windings, or with multiple section windings including a high resistance section and a low resistance section or a winding which may be considered as having a low inductance section and a high inductance section. This latter type winding provides a desirably high starting torque, which is not obtainable by a comparable winding of the single section type. The multiple section winding, however, does not possess as high a maximum torque and has a greater full load slip than a comparable single section squirrel cage winding, and for this reason, single section windings often are used in this type machine. I have found that a desirably high starting torque, high maximum torque, and low full load slip may be obtained by the use of both of these types of windings in the same rotatable member. As shown in Fig. 1, I provide a group of laminations having relatively large deep single section slots 11 around the entire periphery of the laminations, and another group of laminations having a multiple section slot including an outer relatively small conductor slot section 12 and inner relatively large conductor slot section 13 with an interconnecting relatively narrow slot section or neck 14, which connects together the outer section 12 and the inner section 13. These multiple section slots are arranged around the entire periphery of this second group of laminations. As shown in Fig. 2, the slots in these two groups of laminations may extend over the same arcuate span of the different laminations, so that each of these types of laminations is provided with the same number of slots. With such an arrangement, the single section slots are arranged in registry longitudinally through the core with all of the sections of the multiple section slot. In certain instances, the number of slots in the two different types of laminations may be different, so that the single section slots may not correspond in number to the multiple section slots, and with such an arrangement only certain of the slots will extend longitudinally throughout all of the laminations of the core. A winding is formed in the assembled laminations to conform to the various conductor slot sections, and in the portion of the core having the single slot sections 11, the conductors 15 are of a single resistance, single inductance type; and in an arrangement as shown in Fig. 2, these single section conductors are arranged in series with all of the sections of the multiple conductors in the multiple conductor slots. The conductors in the multiple conductor slots each includes a relatively high resistance section 16 in the outer slot section 12, as these are of a relatively small cross-sectional area, and a relatively low resistance conductor section 17 in the inner large slot section 13, as these conductor sections are relatively larger than the sections 16. The relatively narrow connecting slot section 14, which connects the inner and outer sections of the multiple section slots, provides a winding having a relatively low inductance for the section 16 in the outer slot section 12 and a relatively higher inductance for the section 17 in the inner slot section 13. The single section conductors 15 all have a relatively low inductance, and this inductance remains substantially constant under the varying operation conditions from starting to running conditions. In the multiple conductor section of the winding, the effect of the inductance of the several parts of the winding varies considerably from starting to running conditions, producing a corresponding change in current distribution in the various sections of the conductors. This varying impedance effect in this portion of the winding produces an increase in the effective resistance of the multiple section conductor under starting conditions over the effective resistance under normal running conditions. This is a well known feature of this type winding. In order further to insure the individual electrodynamic reaction of the different portions of the winding in accordance with the conventional operating characteristics of the winding of each respective type, I provide a short-circuiting ring 18 of electrically conductive material arranged intermediate the different groups of laminations forming the different portions of the rotatable member and electrically connect this short-circuiting ring to the ends of all of the sections of the conductors in the adjacent groups of laminations. In this manner, the conductive ring 18 short-circuits all of the conductors 16 and 17 at the ends thereof adjacent the conductors 15 and also short-circuits the adjacent ends of the conductors 15. In this manner it is possible to have different currents flowing in the different sections of the winding, as the conductors in the single section portion of the winding are not directly in series with the corresponding conductors in the multiple section portion of the winding. Furthermore, with such an arrangement it is possible to vary the number of slots in the different groups of laminations in any manner desired. The operating characteristics of this type motor may be varied from almost the same as those of a conventional multiple section winding machine to those of a single section winding machine, depending upon the proportion of the two types of windings used in making up the complete winding of the rotatable member. With an arrangement as shown in Fig. 2, the slots in the two types of laminations are arranged in communication, and therefore the two types of conductors are substantially in series with each other. The outer ends of the different conductors are connected together by short-circuiting end rings 19 extending about the outer laminations as in a conventional machine.

This type of winding also may be made from individual conductors, as shown in Fig. 3. In this arrangement, as in the arrangement shown in Figs. 1 and 2, I utilize laminations having two different types of conductor slots. One group of these laminations is formed with single section slots, and the other group of laminations is formed with multiple section slots including an outer relatively small slot section 12 and an inner relatively large slot section 13. In this construction, single conductor sections 20 formed of bars of electrically conductive material, such as copper or aluminum, are arranged in the single section slots 11 and a corresponding conductor section 21 is arranged to extend into the relatively narrow sections 12 of the multiple section slots and into a part of the inner sections 13 of these slots. Additional conductors 22 formed as bars are arranged on each side of the conductors 21 in the relatively large inner slot sections 13 of the multiple section slots. This provides a conductor of relatively large cross-section area in the inner portions 13 of the multiple conductor slots, and therefore this portion of the winding is of a relatively lower resistance, and the outer portion of this multiple winding is of a relatively higher resistance. Furthermore, since the outer slot section 12 is relatively narrow, the magnetic material forming the sides thereof extends inwardly about the outer side of the relatively large inner slot section 13, so that the inductance of the conductor section in this relatively large slot section is higher than the inductance of the outer conductor section. The effective impedance of this slot section also varies from a relatively high effective impedance to a relatively low effective impedance from start to normal running conditions, as explained with respect to Figs. 1 and 2, and the inductance of the single conductor section varies only slightly from start to normal running conditions. In addition, the effective resistance of the multiple conductor section is considerably higher under running conditions, as is well known with conventional windings of this type. As in the arrangement shown in Figs. 1 and 2, a short-circuiting ring 23 of electrically conductive material is arranged intermediate the different groups of laminations and is connected electrically to the ends of the conductors in both adjacent groups of laminations. In this manner the ring 23 short-circuits the conductors 20, 21, and 22 and provides a substantially independent winding in the different groups of laminations. The resistance of the conductor in the outer slot section 12 may also be increased over that in the inner slot section 13 by making the conductors 21 of a higher electrical resistance material than the conductors 22. The relative arrangement of these different conductors is more clearly illustrated in the exploded perspective view of the machine shown in Fig. 4. Short-circuiting end rings 24 are arranged about the outer laminations, and are secured by welding, brazing, soldering, riveting, or in any other suitable manner to the outer ends of the conductors 20, 21, and 22 to connect together these conductors and complete the winding.

A further modification of my invention is illustrated in Fig. 5, wherein laminations 10 are provided with three types of conductor sections. Laminations having the same type of slot sections are assembled in groups, and the slots in different groups are arranged substantially in communication with each other longitudinally through the core. I provide a group of laminations 10 with a single slot section 11, a second group of laminations with a multiple section slot having an outer relatively small section 25 and a relatively large inner section 26 connected to the outer section 25 by a relatively narrow interconnecting section or neck 27. Each of these inner sections 26 is displaced out of radial alignment with respect to its connected outer section 25, so that it is radially in alignment with the outer section 25 of another slot in the same lamination. Laminations having a third type slot are provided having a relatively small outer section 12 and a relatively large inner section 13 connected to the outer section 12 by a relatively narrow interconnecting section or neck 14. In this third type slot, all of the slot sections are arranged in radial alignment. In forming the core, groups of laminations having the same type of slot section are assembled to provide continuous slots longitudinally through the respective groups of laminations, and these laminations are then assembled with these different slots in longitudinal alignment to provide a substantially continuous conductor longitudinally through the core. I have found it desirable to interrupt the continuity of the interconnecting neck section 14 longitudinally through the core, as is more fully explained and claimed in the copending application of Charles C. Leader, Serial No. 301,200, filed October 25, 1939, and assigned to the same assignee as this application. In order to obtain this result, the radially offset multiple section slots provide an interruption of the continuity longitudinally through the core of the interconnecting sections 14 and 27, by arranging the laminations having this offset type slot adjacent laminations having a slot section wherein the inner and outer sections are in radial alignment, as shown in Fig. 5. A further interruption of this interconnecting neck section is obtained by reversing a group of laminations having radially offset inner and outer sections, with respect to another group of similar laminations having inner and outer radially offset slot sections, so that the radially offset displacement of the inner and outer sections is in the opposite direction in the two groups of laminations, as shown in the central two groups of laminations in Fig. 5. A cast squirrel cage winding is formed in these slots, and is made to conform to the various sections of the different slots. With this type winding arrangement a short-circuiting ring of electrically conductive material may be arranged between each of the different groups of laminations, as discussed with respect to Figs. 1 to 4 inclusive, or a short-circuiting ring may be arranged only between certain groups of laminations. As shown in Fig. 5, a short-circuiting ring 28 of electrically conductive material is arranged between the groups of laminations having a single section slot and the next adjacent group of multiple section slot laminations. This short-circuiting ring 28 is connected electrically to all of the adjacent ends of all of the conductors in the single section slots and all of the adjacent ends of all of the conductors in the multiple section slot so as to short-circuit these ends of these conductors. The winding is completed by short-circuiting end rings 29 which connect together the outer ends of the conductors in these slots. In this manner a complete squirrel cage winding of single section conductors is formed by the conductors 15 and a multiple section winding is formed of all of the multiple section conductors in the remainder of the winding.

While I have illustrated and described particular embodiments of my invention, modifications thereof will occur to those skilled in the art. I desire it to be understood, therefore, that my invention is not to be limited to the particular arrangements disclosed and I intend in the appended claims to cover all modifications which do not depart from the spirit and scope of my invention.

What I claim as new and desire to secure by Letters Patent of the United States is:

1. A member for a dynamoelectric machine having a core comprising laminations provided with winding slots formed therein, a winding in said slots including conductors formed as a single relatively low resistance conductor winding section through said slots in a group of said laminations and as a multiple resistance conductor winding through said slots in another group of said laminations, said slots of said group of laminations having multiple resistance conductor slots including an inner relatively low resistance portion and an outer portion of relatively higher resistance than said inner portion, said latter group of laminations including laminations wherein the slots are formed with the inner and outer portions substantially in radial alignment and other laminations wherein each of said inner and outer conductor sections of each slot is displaced out of radial alignment, means for electrically connecting together said conductors in certain of said lamination groups intermediate said groups, and means for electrically connecting together the ends of said conductors to form a complete winding.

2. A member for a dynamoelectric machine having a core comprising laminations provided with winding slots formed therein, a winding in said slots including conductors formed as a single relatively low resistance conductor winding through said slots in a group of said laminations and as a multiple resistance conductor winding through said slots in another group of said laminations, said slots of said group of laminations having multiple resistance conductor slots including an inner relatively low resistance portion and an outer portion of relatively higher resistance than said inner portion, said latter group of laminations including laminations wherein the slots are formed with the inner and outer portions of each slot displaced out of radial alignment and arranged with certain of said laminations having the radial alignment displacement of said inner and outer conductor slot portions in the opposite direction to that in certain other of said laminations, means for electrically connecting together said conductors intermediate certain of said groups of laminations, and means for connecting together the ends of said conductors to form a complete winding.

CAMPBELL MACMILLAN.